May 10, 1966 A. BRAUN 3,250,175
OPTICAL PROJECTOR WITH TRANSVERSE FLOW BLOWER AND
COMPARTMENTALIZED HOUSING
Filed Aug. 4, 1961

INVENTOR.
Arthur Braun
BY Michael S. Striker
Attorney 3,250,175
OPTICAL PROJECTOR WITH TRANSVERSE FLOW BLOWER AND COMPARTMENTALIZED HOUSING
Artur Braun, Frankfurt am Main, Germany, assignor to Braun Aktiengesellschaft, Frankfurt am Main, Germany
Filed Aug. 4, 1961, Ser. No. 130,457
Claims priority, application Germany, Aug. 4, 1960, B 58,860
2 Claims. (Cl. 88—24)

This invention relates to optical projectors, both of the still picture and cinematograph type, provided with a cooling blower to cool the illuminating system and picture trap. The invention is more particularly concerned with the construction of the cooling blower and its arrangement in the projector housing.

The known projectors have for this purpose either a radial or axial blower for cooling the lamp housing carrying the lamp mirror and condenser and for cooling the picture trap. These blowers can either be arranged to work as suction or pressure blowers. As used herein, the term "radial blower" refers to a radial flow fan, that is, a centrifugal fan wherein, after air has been admitted axially, the air is discharged radially of the axis of rotation. The term "axial blower" refers to an axial flow fan or propeller fan wherein air is admitted and discharged in parallel to the axis of rotation.

An axial blower, commonly referred to as a fan when arranged to work as a pressure blower, is placed in the lower part of the projector housing with its axis either horizontal or vertical. It draws in air from the outside through air entry openings in the bottom or side wall of the housing and blows the air along guide faces adjoining its outlet defuser to the picture trap and the illuminating system so that the heat is removed from the latter and is carried from the housing by the air flowing out again through air outlet openings in the top part of the housing. If the fan is to work as a suction blower it is arranged above the lamp in the upper part of the housing with its axis vertical. It draws heated air surrounding the picture trap and illuminating system and passes it through the air outlet openings, already mentioned, in the upper part of the housing to the outside. The outlet openings are usually of the honeycomb type and are sufficiently deep to serve as a light barrier at the same time.

When used in projectors radial blowers usually operate as suction blowers; one such blower can be arranged like a fan with its axis vertical placed above the lamp or can be placed below it in the housing. It sucks in the heated air passes it through air outlet openings in both side wall of the housing to the external atmosphere.

Both radial and axial blowers in projectors have the disadvantage that they cause excessive noise when running. However, this is not the only ground for the apparent unsuitability of axial and radial blowers for cooling purposes in projectors; there is the poor efficiency of these blowers which can be appreciated from the fact that the impeller, for example, of an axial blower should have a diameter approximately equal to the length of the illumination system-picture trap arrangement in order to achieve a sufficient and continuous cooling of the whole system. However, since the illumination system and the picture trap are considerably narrower than the diameter of the impeller, segments of the impeller would project on both sides which would be unfavourable for the dimensioning of the projector and moreover lead to an insufficient use of the potential cooling action of the blower so that the projecting segments would be superfluous. Such a blower works with a poor thermal efficiency. The same can also be said of a radial blower used as a suction blower, and in addition the suction ducts only cover a small part of the illumination system, let alone the picture trap, and this cannot be corrected by suitable arrangement of guide faces.

Since efforts to reduce the outer dimensions of projectors are also defeated by the minimum necessary dimensions of usual blowers, it makes no difference whether the blower is arranged above or below the illumination system, for on account of the accommodation of an impeller with a relatively large diameter, the housing of the projector must be substantially broader and higher than is really necessary. On these aerodynamic grounds it has not hitherto been possible to reduce its size and consequently cheapen projectors without reducing their performance as regards illumination.

One object of the present improvements is to circumvent these disadvantages and to make possible the construction of a projector with a silent-running blower which has a greater output even for a given physical size than a conventional blower and is so proportioned that it is possible to reduce in size the projector housing.

According to one improvement a transverse-flow blower is used to cool the picture trap and the lamp housing. The transverse flow blower is a rotary machine in which air is admitted and discharged transversely of the axis of rotation so that it flows across the axis. This type of blower can either work as a suction or pressure blower and consists of a drum rotating between guide faces and for a similar output needs a motor of lower power and rotational speed than a conventional blower, is relatively small, and is almost silent in operation. It has the further advantage that its drum can work as a light barrier so that a special air guide connecting it with the atmosphere is not necessary; to achieve this the distances between the blades of the drum must be so arranged that, seen in the direction of the incident light, adjacent blades overlap. Instead of using a relatively thick walled honeycomb like light barrier in the wall of the housing which additionally impedes the entry of the air, it is now sufficient to use an outlet opening in the housing only provided with a grid to prevent the drum being touched.

The transverse flow blower can advantageously be accommodated in the lower part of the projector housing with its drum axis approximately parallel to the optical axis so that it works as a pressure blower. The air outlet opening of the blower is below the picture trap and lamp housing, while the suction inlet opening of the blower is in one side wall of the lamp housing and, as already mentioned, is provided with a grid.

The blower, however, could also be caused to operate as a suction blower above the picture trap and the illumination system in a similar manner so that its suction inlet opening would extend over, and be turned towards, the whole length of the picture trap, condenser, lamp and mirror. Its outlet side would be right in the cover part of the housing or in a side wall. In this arrangement the cooling air would be sucked in through air inlet openings in the housing bottom.

Both arrangements have the advantage that the dimensions of the transverse flow blower can be matched fully to those of the picture trap and lamp housing, that is to say, the impeller diameter can be approximately equal to the breadth of the picture trap while the length can correspond to the arrangement comprising the picture trap condenser lamp and mirror so that the blower can operate at full efficiency. There is also the further advantage that the projector housing only has to be broad enough to accommodate the diameter of the condenser or the breadth of the picture trap while, in contrast to known projectors fitted with a vertically mounted blower the height is also lower.

In all the improvements so far discussed it should be finally noted that the transverse flow blower in comparison with other known blowers has the additional advantage that transverse flow blowers have higher parameters for differential head, volumetric flow and efficiency, and since these are the basic criteria to be referred to in research aimed at achieving smaller dimensions and more efficient cooling, it therefore follows that there is the final advantage of being able to use more powerful lamps in the smallest possible projector housing.

The drum or rotor of the blower can be driven by a small electric motor, the shaft of the motor being connected with the adjacent radial disc of the rotor or drum. Further particulars and advantages of the improvements are now explained with reference to two embodiments given by way of illustration only, and shown schematically in the accompanying drawing.

Figure 1:
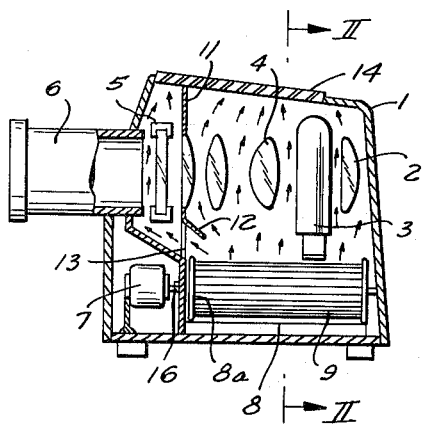
FIGURE 1, shows a stationary picture projector in longitudinal section with a longitudinally arranged pressure blower.
Figure 2:
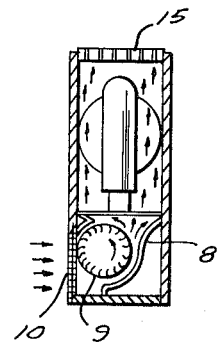
FIGURE 2, is a section on the line I—I of FIGURE 1.

The stationary picture projector shown in FIGURES 1 and 2 has a housing 1 which encloses an illumination system accommodated in a lamp housing and comprising mirror 2, lamp 3 and condenser system 4, and picture trap or guide 5 on the optic axis of the objective 6. A transverse flow blower 8, which is arranged to function as a pressure blower, is driven by the motor 7 and is accommodated in the lower part of the housing. The impeller drum or rotor 9 sucks in air through the gridded air entry opening 10, in the side wall of the housing and passes it as shown by the arrows for the most part into the lamp housing. Part of the stream of air is drawn off by the guide sheet or fin 12 which is cut out of the partition wall 11 and this air then passes to the picture trap through the opening 13 which has thus been formed. It will be noted that partition wall 11 extends between opposite walls of housing 1 and defines a first compartment housing the projection light source lamp 3 and a second compartment housing the picture guide 5 thereby reducing the heat transmitted from the lamp 3 to the picture guide 5. The length of the blower approximately corresponds to the length of the illumination system and stretches along the latter so that the air drawn in from outside it is blown on to all parts of the illumination system and on to the picture trap evenly. The air blown on to these parts removes the heat radiated by the lamp and removes the heat through air outlet openings 14 in a plate 15 removably fixed in the upper wall of the housing.

The fact that the air inlet opening 10 is a thin grid which simply serves as a protection against touching the blower, and not a thick walled honeycomb-like light barrier is a particular advantage which is due to the use of a blower in which the blades of the drum or rotor are so arranged that they overlap so that the drum itself acts as a light barrier. The degree of overlapping chosen is unity but it can also be greater than unity.

The connection between the drum or impeller and the motor is constituted by a rubber bush fixed to the radial disc 8a of the drum and around the stump shaft 16 of the motor.

Figure 3:
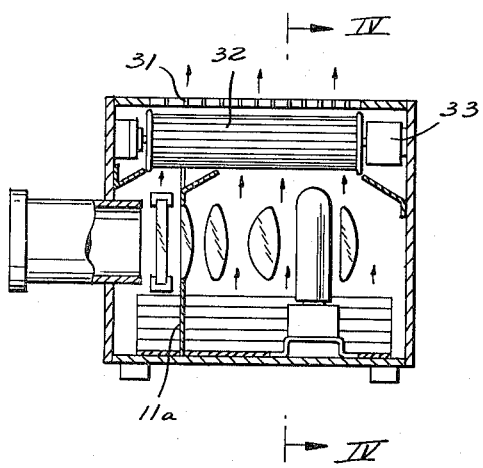
FIGURE 3, shows still another stationery picture projector in longitudinal section and having a longitudinally arranged suction blower.
Figure 4:
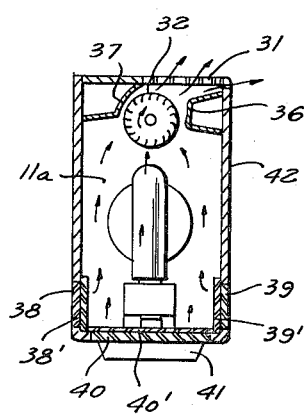
FIGURE 4, shows a section along the line II—II of FIGURE 3.

FIGS. 3 and 4 shows elevational and transverse sections, respectively, through a projector having an air blower 32 of the transverse flow type disposed in a blower compartment at a level above the source of light and the picture guide. The blower 32 driven by a motor 33 is located between air guide faces 36, 37 and draws air into the housing 42 through inclined openings 38, 39, 40 in the outer bottom wall and the outer side walls of the housing, respectively. Oppositely inclined openings 38', 39', 40' in inner wall portions of the housing cooperate with the openings 38, 39, 40 to prevent light rays from passing directly therethrough. Air drawn into the housing flows from the bottom towards the top past the picture guide and the source of light, traverses the blower 32 and will then be forced out through the protective top wall or screen 31. The latter may include a lateral opening as indicated at the upper right hand corner of FIG. 4. The housing rests on supporting members 41 and, similarly to the embodiment illustrated in FIGS. 1 and 2, also includes a partition wall 11a which extends between opposite walls of the housing 42 to define therein a first compartment housing the light source, and a second compartment housing at least the picture guide and each communicating with the blower comparement.

The transverse flow blower is in all cases narrower than the diameter of the condenser system so that the projector housing does not have to be made specially broad and is fully utilized.

While a few embodiments of the improvements have been described so that those skilled in the art may be able to benefit from the new principles of projector construction, it is to be understood that the monopoly of the patent is not limited to these particular forms of construction but covers everything embodying the spirit and gist of the improvements as defined by the following patent claims.

I claim:

1. In an optical projector, in combination, a housing having opposite walls and including a first compartment housing the projecting light source, a second compartment housing at least the picture guide, a partition wall extending between said opposite walls of said housing and defining said compartments, thereby reducing heat transmission from said light source in said first compartment to said picture guide in said second compartment, and a blower compartment, said blower compartment directly communicating with both said first and said second compartment through a first opening directly connecting said blower compartment with said first compartment and a second opening directly connecting said blower compartment with said second compartment; and an air blower of the transverse flow type located in said blower compartment and having a first portion located opposite said first opening and a second portion located opposite said second opening so as to simultaneously cool said first and said second compartments.

2. In an optical projector, in combination, a housing having opposite walls and including a first compartment housing the projecting light source, a second compartment housing at least the picture guide, a partition wall extending between said opposite walls of said housing and defining said compartments, thereby reducing heat transmission from said light source in said first compartment to said picture guide in said second compartment, and a blower compartment, said blower compartment directly communicating with both said first and said second compartment through a first opening directly connecting said blower compartment with said first compartment and a second opening directly correcting said blower compartment wtih said second compartment; and an elongated air blower of the transverse flow type located in said blower compartment and having an axis of rotation substantially parallel to said optical axis, said air blower having a first portion located opposite said first opening and a second portion located opposite said second opening so as to simultaneously cool said first and said second compartments.

References Cited by the Examiner
UNITED STATES PATENTS

| | | | |
|---|---|---|---|
| 2,281,988 | 5/1942 | Osterberg et al. | 88—24 |
| 2,562,600 | 7/1951 | Cadwell et al. | 88—24 X |
| 2,779,236 | 1/1957 | Pollan | 88—26 X |
| 2,817,267 | 12/1957 | Halahan et al. | 88—24 |
| 2,942,773 | 6/1960 | Eck | 230—125 |
| 2,986,968 | 6/1961 | Kropp et al. | 88—24 |
| 3,019,701 | 2/1962 | Brueckner et al. | 88—26 X |
| 3,107,845 | 10/1963 | Helmbold | 230—125 |
| 3,181,415 | 5/1965 | Laing | 88—24 |

NORTON ANSHER, *Primary Examiner.*

WILLIAM MISIEK, *Examiner.*

D. J. HOFFMAN, H. H. FLANDERS,
*Assistant Examiners.*